No. 838,699. PATENTED DEC. 18, 1906.
C. A. EDLUND.
CENTRIFUGAL LIQUID SEPARATOR.
APPLICATION FILED MAR. 14, 1905.
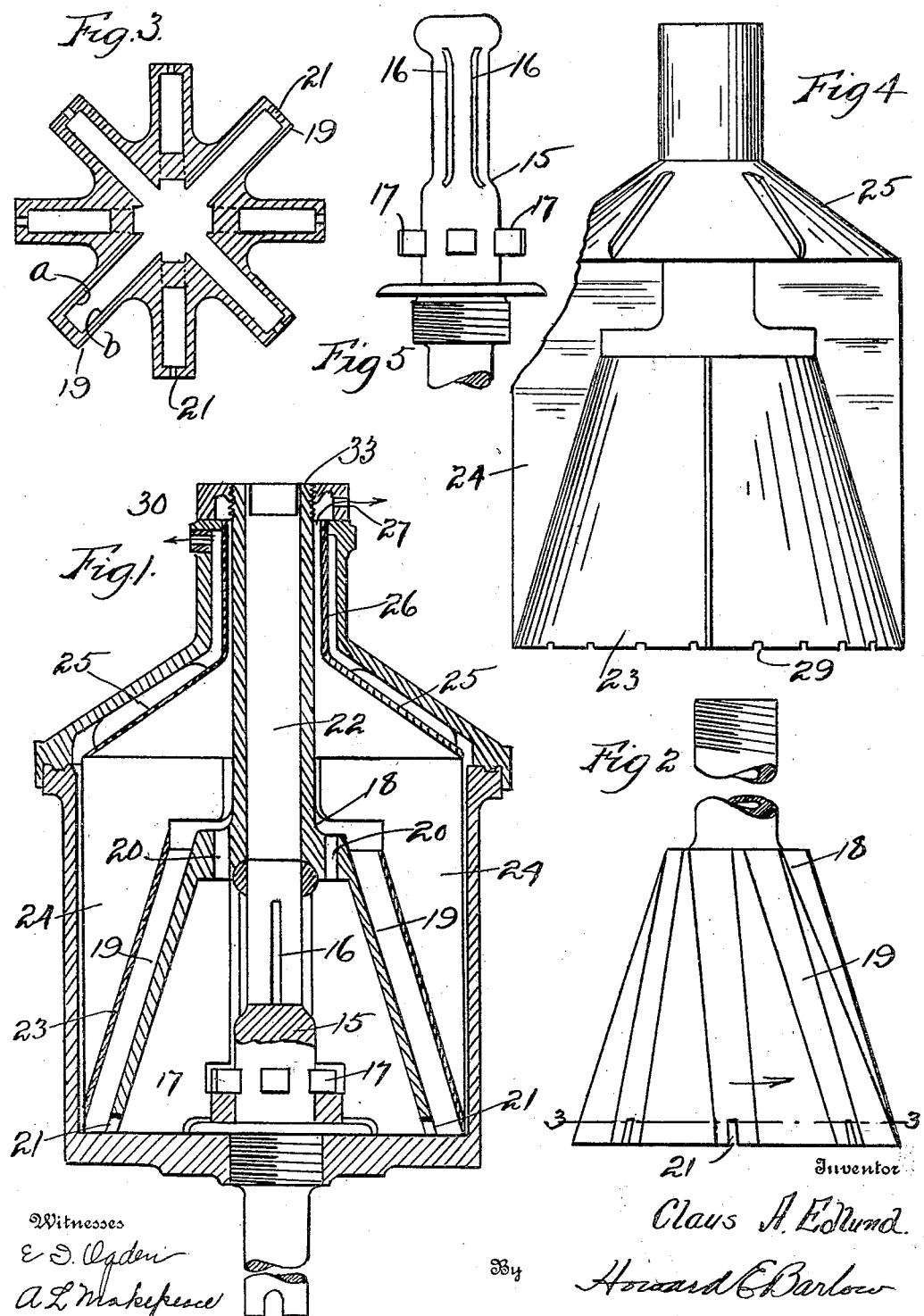

UNITED STATES PATENT OFFICE.

CLAUS A. EDLUND, OF PROVIDENCE, RHODE ISLAND, ASSIGNOR OF ONE-HALF TO EMIL BERNSTROM, OF PROVIDENCE, RHODE ISLAND.

CENTRIFUGAL LIQUID-SEPARATOR.

No. 838,699.      Specification of Letters Patent.      Patented Dec. 18, 1906.

Application filed March 14, 1905. Serial No. 250,034.

*To all whom it may concern:*

Be it known that I, CLAUS A. EDLUND, a resident of the city of Providence, in the county of Providence and State of Rhode Island, have invented certain new and useful Improvements in Centrifugal Liquid-Separators; and I do hereby declare that the following is a full, clear, and exact description thereof, reference being had to the accompanying drawings, and to the characters of reference marked thereon, which form a part of this specification.

This invention contemplates certain new and useful improvements in centrifugal separators and relates more particularly to that class of devices for separating a compound liquid or an emulsion into its constituent liquids of different densities.

My invention is especially designed for separating full-milk into cream and skim-milk, and has for its object the production of means whereby the full-milk is acted upon immediately as it leaves the center supply-pipe, whereby separation commences at once, the advantage being that the nearer the center the separation takes place the easier it is for the cream to separate from the milk and rise.

In carrying out the invention I provide a plurality of hollow tapering ribs set at an angle to the perpendicular axis of the machine, each rib offering two paths or surfaces, one to direct the milk downward and the other to direct the cream upward, the screw action of these ribs when rapidly rotated greatly facilitating the separation.

The invention will be hereinafter fully set forth, and particularly pointed out in the claims.

In the accompanying drawings, Figure 1 is a longitudinal section illustrating my invention. Fig. 2 is a detail view of the hollow ribbed liner. Fig. 3 is a horizontal sectional view on the line 3 3, Fig. 2. Fig. 4 is a side elevation of the supplemental liner. Fig. 5 is a detail of the center post into which is locked the liner.

Referring to the drawings, 11 designates the bowl that is driven and supported from a suitable speed-spindle by the spindle 12. This latter spindle is forked or slotted at its lower end 13 to fit over a suitable pin, (not shown,) thereby affording a ready means for connecting and disconnecting the bowl from the speed-spindle. Extending upwardly from the bottom of this bowl is the center post 15. This post is hollow from its upper end down a portion of its length and slotted at 16 to form a plurality of outlets for the inflowing milk. At 17 on this post is shown a plurality of locking-lugs. Fitting over this center post 15 is the main liner 18, the lower portion of which is arranged to engage and be locked under the lugs 17, thereby securely holding said liner in position. This line is provided with a plurality of radial hollow ribs 19, converging in toward the center as they extend upward, said ribs being also set at an angle to the perpendicular axis of the member to act in the nature of a screw to raise the cream more rapidly. Outlets 20 are provided for the cream as it rises up the sides of the hollow ribs. As the skim-milk drops it passes out through the holes 21 at the lower ends of the ribs. These ribs serve a double purpose—first, they extend in close proximity to the center and pick up the full-milk as it enters through the slots 16 and immediately imparts to it the velocity of the revolving bowl, and, second, this plurality of hollow ribs presents a greater number of surfaces up which the cream may be forced upon being displaced by the heavier milk. Extending upward from the liner 18 is the hollow neck 22, which is threaded at its upper end. For further separating the cream that may be left in the milk I have provided a supplemental liner 23, having a plurality of wings 24. The cream may pass up both the inside and outside of this supplemental liner, which is of truncated-cone shape. It will also pass up one side of each of the wings under the hood 25, where it will join the cream from the ribbed portion of separator 18, pass up through the space 26, around the neck, and out through the hole 27. The milk passes out through the small holes 21 at the bottom of the cone and up along the side walls and out through the opening 30. The cap 33 is threaded to engage the threads of the neck 22.

The operation is as follows: The full-milk is supplied to the neck or extension 22, and as it passes out through the slots 16 it is immediately caught by the hollow ribs 19 and set to revolving at a tremendous velocity in the direction indicated by the arrow, and as the centrifugal force acts on the liquids the heavier liquid naturally takes the side of the wall marked *a* and crowds out or displaces the lighter or creamy portion, which latter is forced to travel up the wall marked *b* on the opposite side of the rib. The angular pitch of the wall causes the cream to rise easily and rapidly, and by extending the ribs practically to the center separation commences so near the center that the cream may travel straight up, thereby moving much easier and faster than it would if thrown out to the sides of the bowl and was then compelled to travel back nearly to the center as it worked its way up to the delivery-point. After this separation takes place the skim-milk passes out through the apertures 21 at the lower ends of the ribs and is again acted upon by the supplemental liner 23 and its wings 24 to pick up any particles of cream that may not have been taken up by the ribs 19.

The advantages of my improved separator will be at once apparent to those skilled in the art. It will be particularly noted that by extending the hollow radial ribs to the approximate center and providing a large number of them they serve to pick up the milk at once and divide the bulk up in a series of little individual chambers, causing the separation to be very quick, effective, and complete. In this manner I secure a maximum capacity and efficiency, whereby large quantities of milk can be readily and easily handled.

I claim as my invention—

1. A centrifugal separator comprising a rotatable bowl, and a liner located therein and keyed to rotate therewith, said liner being provided with a plurality of hollow ribs set at an angle to the perpendicular axis thereof and a centrally-located extension.

2. A centrifugal separator comprising a rotary shaft having an upper chambered portion provided with outlets, a bowl mounted to rotate with said shaft, a liner located in said bowl and keyed to said shaft, said liner being provided with hollow ribs set at an angle to the perpendicular axis thereof, and a centrally-located extension arranged in prolongation of said shaft.

3. A centrifugal separator comprising a rotatable shaft provided with lugs, a bowl mounted to rotate with said shaft, and a liner located in said bowl and engaging the lugs of said shaft, said liner being provided with hollow ribs set at an angle to the perpendicular axis thereof, and a centrally-located extension arranged in prolongation of said shaft.

4. A centrifugal separator comprising a rotatable shaft, a bowl mounted to rotate therewith, and a liner located in said bowl and keyed to said shaft, said liner being provided with hollow ribs set at an angle to the perpendicular axis thereof, and a centrally-located extension arranged in prolongation of said shaft.

5. A centrifugal separator comprising a rotatable shaft, a bowl mounted to rotate therewith, a liner located in said bowl and keyed to said shaft, said liner being provided with hollow ribs set at an angle to the perpendicular axis thereof, and a centrally-located extension arranged in prolongation of said shaft, said ribs being provided with milk-outlets at their lower ends and cream-outlets at their upper ends.

6. A centrifugal separator comprising a rotatable shaft, a bowl mounted to rotate therewith, a main liner located in said bowl and keyed to said shaft, said liner being provided with hollow ribs set at an angle to the perpendicular axis thereof, and a centrally-located extension arranged in prolongation of said shaft, and a supplemental liner fitting over said main liner.

7. A centrifugal separator comprising a rotatable shaft, a bowl mounted to rotate therewith, a main liner located in said bowl and keyed to said shaft, said liner being provided with hollow ribs set at an angle to the perpendicular axis thereof, and a centrally-located extension arranged in prolongation of said shaft, and a supplemental liner fitting over said main liner and provided with wings, the upper portions of which contact with the exterior of said extension.

8. A centrifugal separator comprising a rotatable shaft, a bowl mounted to rotate therewith, a main liner located in said bowl and keyed to said shaft, said liner being provided with hollow ribs set at an angle to the perpendicular axis thereof, and a centrally-located extension arranged in prolongation of said shaft, and a supplemental liner fitting over said main liner and provided with a hood surrounding said extension, said supplemental liner being also provided with radiating ribs.

9. A centrifugal separator comprising a rotatable shaft provided with an upper chambered portion having outlets, a bowl mounted to rotate with said shaft, a main liner located in said bowl and keyed to said shaft, said liner being provided with hollow ribs set at an angle to the perpendicular axis thereof, and a centrally-located extension arranged in prolongation of said shaft, and a supplemental liner provided with a hood surrounding said extension, said supplemental liner being also provided with radiating ribs.

In testimony whereof I have hereunto set my hand this 11th day of March, A. D. 1905.

CLAUS A. EDLUND.

In presence of—
HOWARD E. BARLOW,
E. I. OGDEN.